(12) United States Patent
Hassani et al.

(10) Patent No.: US 12,221,068 B2
(45) Date of Patent: Feb. 11, 2025

(54) BIOMETRIC AUTHENTICATED VEHICLE START WITH PAIRED SENSOR TO KEY INTRUSTION DETECTION

(71) Applicant: FORD GLOBAL TECHNOLOGIES, LLC, Dearborn, MI (US)

(72) Inventors: Ali Hassani, Ann Arbor, MI (US); Ryan Joseph Gorski, Grosse Pointe Farms, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 980 days.

(21) Appl. No.: 17/079,224

(22) Filed: Oct. 23, 2020

(65) Prior Publication Data

US 2022/0126788 A1 Apr. 28, 2022

(51) Int. Cl.
  *B60R 25/24* (2013.01)
  *B60R 25/20* (2013.01)
  (Continued)

(52) U.S. Cl.
  CPC .......... *B60R 25/246* (2013.01); *B60R 25/209* (2013.01); *B60R 25/252* (2013.01); *H04L 9/0643* (2013.01); *H04L 9/0825* (2013.01); *H04L 9/3231* (2013.01); *B60R 25/25* (2013.01); *B60R 2325/108* (2013.01); *H04L 2209/84* (2013.01)

(58) Field of Classification Search
  CPC ............ G07C 9/00309; G07C 9/25–26; G07C 9/00563; B60R 25/246; B60R 25/25; B60R 2325/108; B60R 25/252; B60R 25/255; B60R 25/257; H04L 9/3263; H04L 9/3271; H04L 63/0861; H04L 63/0823; H04L 9/0825; H04L 9/3231; H04L 9/0643; H04L 9/0822; H04L 9/3242; H04W 12/069; H04W 12/12
  USPC ........................ 382/115, 124; 340/5.52, 5.53
  See application file for complete search history.

(56) References Cited

U.S. PATENT DOCUMENTS 7,961,076 B2  6/2011  Kelley et al.
9,002,536 B2  4/2015  Hatton
(Continued)

FOREIGN PATENT DOCUMENTS

BR  102017016287 B1 *  3/2024  ............ B60W 50/00
CA  2952084 A1 *  12/2015  ........... B60R 25/241
(Continued)

OTHER PUBLICATIONS

Hakeem, Shimaa A. Abdel, Mohamed A. Abd El-Gawad, and HyungWon Kim. "A decentralized lightweight authentication and privacy protocol for vehicular networks." IEEE Access 7 (2019): 119689-119705. (Year: 2019).*
(Continued)

*Primary Examiner* — Cuong H Nguyen
(74) *Attorney, Agent, or Firm* — Frank Lollo; Brooks Kushman P.C

(57) ABSTRACT

A system for secure sensor operation is provided. A sensor circuit includes a smart controller configured to provide trusted data. An operational circuit includes an operational controller configured to, responsive to receipt of a request from the sensor circuit, perform an identity verification using a cryptographic challenge to authenticate the sensor circuit before utilizing the trusted data.

17 Claims, 5 Drawing Sheets

(51) Int. Cl.
  *B60R 25/25*  (2013.01)
  *G07C 9/25*  (2020.01)
  *H04L 9/00*  (2022.01)
  *H04L 9/06*  (2006.01)
  *H04L 9/08*  (2006.01)
  *H04L 9/32*  (2006.01)
  *H04W 12/12*  (2021.01)

(56) References Cited

U.S. PATENT DOCUMENTS

| | | | |
|---|---|---|---|
| 10,442,399 | B2 | 10/2019 | Penilla et al. |
| 10,486,647 | B2 * | 11/2019 | Lee .................. G06V 40/1376 |
| 10,505,920 | B2 * | 12/2019 | Kumar ...................... G06F 8/71 |
| 10,657,261 | B2 * | 5/2020 | Kumar .................. H04L 9/0825 |
| 11,251,959 | B2 * | 2/2022 | Wentz ................... H04L 9/3247 |
| 11,688,236 | B2 * | 6/2023 | Thoeni .................. A63F 13/655 |
| | | | 463/29 |
| 2007/0106892 | A1 * | 5/2007 | Engberg ................ H04L 9/0825 |
| | | | 713/168 |
| 2010/0148923 | A1 * | 6/2010 | Takizawa .............. B60R 25/252 |
| | | | 340/5.82 |
| 2010/0150353 | A1 * | 6/2010 | Bauchot ................ H04L 9/3271 |
| | | | 713/168 |
| 2011/0317840 | A1 * | 12/2011 | Ciet ...................... H04L 9/3242 |
| | | | 380/277 |
| 2015/0095999 | A1 * | 4/2015 | Toth ...................... H04L 9/3263 |
| | | | 726/6 |
| 2017/0104597 | A1 * | 4/2017 | Negi .................... H04L 9/0825 |
| 2019/0163912 | A1 * | 5/2019 | Kumar .................. H04L 9/0825 |
| 2019/0166116 | A1 * | 5/2019 | Kumar .................. H04L 9/3268 |
| 2019/0166117 | A1 * | 5/2019 | Kumar .................. H04L 9/0891 |
| 2019/0248333 | A1 * | 8/2019 | Lee ....................... B60R 25/246 |
| 2021/0091952 | A1 * | 3/2021 | Wentz .................. H04L 9/3278 |
| 2022/0126788 | A1 * | 4/2022 | Hassani ................ H04L 9/0825 |
| 2023/0017001 | A1 * | 1/2023 | Kang .................. G07C 9/00309 |

FOREIGN PATENT DOCUMENTS

| | | | | |
|---|---|---|---|---|
| CA | 2952084 | C * | 9/2022 | ............ B60R 25/241 |
| CN | 102073819 | A * | 5/2011 | ............. G06F 21/10 |
| CN | 102882677 | A * | 1/2013 | ............. G06F 21/10 |
| EP | 4113927 | A1 * | 1/2023 | ............. B60R 25/25 |
| ES | 2668450 | A1 * | 5/2018 | |
| JP | 3930319 | B2 * | 6/2007 | ........... A61B 5/0537 |
| JP | 2014145200 | A | 8/2014 | |
| JP | 7267293 | B2 * | 5/2023 | ............. G06F 21/57 |
| JP | 7267294 | B2 * | 5/2023 | ......... G06F 16/1834 |
| KR | 20160093764 | A * | 8/2016 | ............... H04L 9/12 |
| WO | WO-2019108436 | A1 * | 6/2019 | ......... G06F 16/1834 |
| WO | WO-2019108438 | A1 * | 6/2019 | ............. G06F 21/57 |

OTHER PUBLICATIONS

Jiang, Qi, et al. "Two-factor authentication protocol using physical unclonable function for IoV." 2019 IEEE/CIC International Conference on Communications in China (ICCC). IEEE, 2019. (Year: 2019).*

Roeschlin, Marc, et al. "Bionyms: Driver-centric message authentication using biometric measurements." 2018 IEEE Vehicular Networking Conference (VNC). IEEE, 2018. (Year: 2018).*

Chatterjee, Santanu, et al. "Secure biometric-based authentication scheme using Chebyshev chaotic map for multi-server environment." IEEE Transactions on Dependable and Secure Computing 15.5 (2016): 824-839. (Year: 2016).*

An NPL version of Braveman et al., System and method for facilitating user access to vehicles based on biometric information, (Year: 2015).*

Hicks, Christopher Richard Allden. Cryptographic key management for the vehicles of tomorrow. Diss. University of Birmingham, 2020. (Year: 2020).*

Radu, Andreea-Ina. Securing the in-vehicle network. Diss. University of Birmingham, 2020. (Year: 2020).*

Chattopadhyay, Anupam, Kwok-Yan Lam, and Yaswanth Tavva. "Autonomous vehicle: Security by design." IEEE Transactions on Intelligent Transportation Systems 22.11 (2020): 7015-7029. (Year: 2020).*

Sharma, Chandra, et al. "Review of the security of backward-compatible automotive inter-ECU communication." IEEE Access 9 (2021): 114854-114869. (Year: 2021).*

Tahir et al., BioFIM: Multifactor Authentication for Defeating Vehicle Theft, Proceedings of the World Congress on Engineering 2008, vol. I, WCE 2008, Jul. 2-4, 2008, London, United Kingdom.

Cho et al., Fingerprinting Electronic Control Units for Vehicle Intrusion Detection, Proceedings of the 25th USENIX Security Symposium, Aug. 10-12, 2016, Austin, Texas.

* cited by examiner

BIOMETRIC AUTHENTICATED VEHICLE START WITH PAIRED SENSOR TO KEY INTRUSTION DETECTION

TECHNICAL FIELD

Aspects of the disclosure relate to biometric-authenticated vehicle start, as well as to pairing biometric sensors to key circuits to detect and mitigate security intrusions.

BACKGROUND

Many vehicles today include a push button that may be pressed to request vehicle start. For such systems, it is generally a prerequisite that a key fob is detected as being within the vehicle cabin. Pushbutton start systems are a convenience for users, as the vehicle may be started while the fob remains in the user's pocket or bag.

SUMMARY

In one or more illustrative examples, a system for secure sensor operation is provided. The system includes a sensor circuit including a smart controller configured to provide trusted data. The system also includes an operational circuit including an operational controller configured to, responsive to receipt of a request from the sensor circuit, perform an identity verification using a cryptographic challenge to authenticate the sensor circuit before utilizing the trusted data.

In one or more illustrative examples, a method for secure biometric-authenticated start of a vehicle is provided. Responsive to receipt of a start request from a biometric controller of a sensor circuit to a key controller of a key circuit, a challenge word is sent to the sensor circuit to validate a pairing of the sensor circuit to the key circuit. An encryption result is received from the sensor circuit based on the challenge word and a private key previously provided to the sensor circuit in a pairing mode. The start request is authenticated responsive to the encryption result being confirmed according to a copy of the private key maintained by the key circuit.

In one or more illustrative examples, a non-transitory computer-readable medium including instructions for secure biometric-authenticated start of a vehicle that, when executed, cause a key controller of a key circuit and a biometric controller of a sensor circuit to, in a pairing mode, generate a private key by the biometric controller of the sensor circuit and send the private key to the key controller; store the private key a secure enclave of the sensor circuit; store a copy of the private key to a secure enclave of the key circuit; in a consumer mode, receive biometric data from a biometric sensor responsive to a user press of a button signaling a body control module; send a start request, from the biometric controller to the key controller, responsive to the biometric data matching to learned biometric data stored to the secure enclave of the key circuit; responsive to receipt of the start request from the biometric controller to the key controller, send a challenge word to the sensor circuit to validate a pairing of the sensor circuit to the key circuit; receive an encryption result from the sensor circuit based on the challenge word and the private key previously provided to the sensor circuit in the pairing mode; and authenticate the start request responsive to the encryption result being confirmed according to the copy of the private key maintained by the key circuit.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Securing a sensor to an operational controller may be desirable to ensure that the sensor is providing correct or otherwise validated data to the controller. For instance, it may be desirable for a system to ensure that smart automated driving sensors, such as cameras, radars, LIDARs, etc. that communicate with integrated signal processing chipset have not been replaced with inferior or non-standard sensors connected to those chipsets.

As a more specific example, an aftermarket biometric start button may be retrofitted into current production vehicles. Such a device may involve various security features. In an example, one security feature may involve pairing the sensor microprocessor (e.g., a smart controller) to the key microprocessor (e.g., an operational controller), such that a private key transaction is made. In a second example, a security feature may involve validating the pairing via challenge keys (e.g., random word challenges) to detect intrusions. This may address situations in which a malicious unauthorized user attempts to put his or her own learned sensor onto a different vehicle's key circuit.

The described approaches may further provide for a security action process for no responses, delayed/incomplete responses, and incorrect responses. Additionally, an option may be implemented for disabling the internal body control module (BCM) contact shorting block after repeated incorrect responses, to prevent the malicious users from sending crank requests. Further aspects of the disclosure are described in detail herein.

Figure 1:
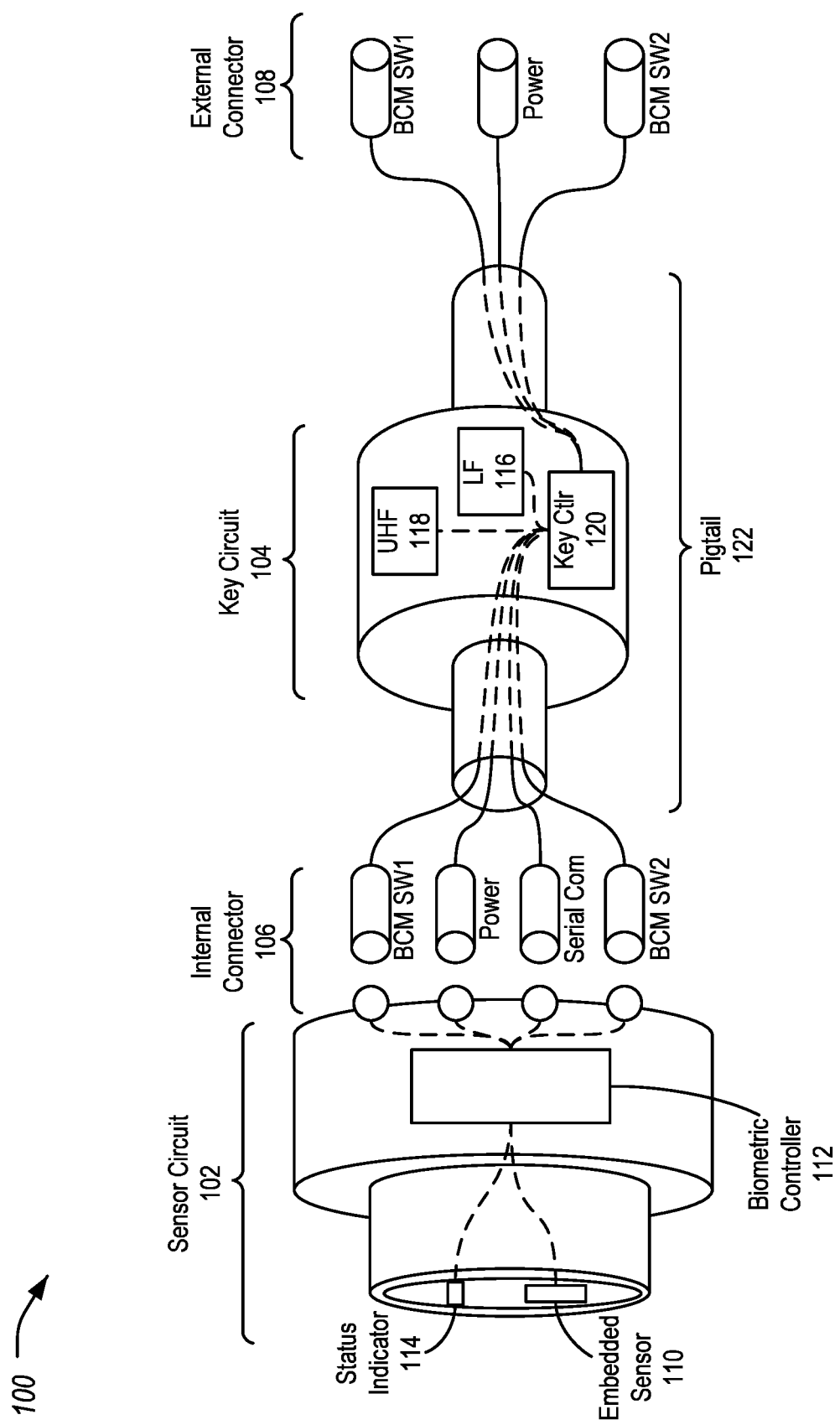
FIG. 1 illustrates an example illustrates an example fingerprint authenticated start button for performing security actions according to validation of a security challenge.

FIG. 1 illustrates an example fingerprint authenticated start button 100. As shown, the fingerprint authenticated start button 100 includes a sensor circuit 102 connected to a key circuit 104 via an internal connector 106, as well as an external connector 108 to connect the fingerprint authenticated start button 100 to the remainder of the vehicle. To signal a request to start the vehicle, the button of the sensor circuit 102 is pressed by a user, thereby causing first and second BCM switching lines to be connected. The sensor circuit 102 is configured to validate the user biometrics, which if confirmed, causes the key circuit 104 to communicate with the vehicle to provide authentication to the BCM to start the vehicle.

Referring to the sensor circuit 102, a biometric sensor 110 of the sensor circuit 102 is configured to capture the biometrics of a user. As shown, the biometric sensor 110 may be a fingerprint scanner device embedded into the start button. Thus, the biometric sensor 110 can capture the biometrics of the user as the vehicle start is requested. In some implementations, the biometric sensor 110 may be a capacitive sensor that measures finger conductivity via an electrostatic field formed using an array capacitor circuits that track the details of a fingerprint, and creates a digital image based on the electrostatic field. In another example, the biometric sensor 110 may be an optical device that illuminates the finger and generates a digital image of the fingerprint using a light-sensitive microchip. It should also be noted that fingerprints are merely one example of a biometric that may be used for access, and voiceprints or other user biometrics may additionally or alternately be used.

The biometric controller 112 of the sensor circuit 102 stores biometric data with respect to an authorized user. For example, this information regarding authorized users may be maintained to a secure enclave of the biometric controller 112. The secure enclave may be implemented in some examples as hardware-based key manager isolated from a main processor of the biometric controller 112 to provide an extra layer of security. In a programming mode, such as a factory mode before the vehicle has been delivered to the user or in a service mode in which an authorized maintenance provider is operating on the vehicle, the biometric data of the user may be applied to the secure enclave. When in a customer mode or operation mode, the biometric controller 112 may request that comparison or other operations be performed using the biometric data, but only result of the operations may be provided back from the secure enclave, not the raw authorized user biometrics themselves.

The sensor circuit 102 may include a status indicator 114 controlled by the biometric controller 112 to provide information with respect to the status of the fingerprint authenticated start button 100 to the user. As shown, the status indicator 114 is a light-emitting diode (LED) light, but this is only one possibility. In an example, the status indicator 114 may indicate a first color when the fingerprint authenticated start button 100 is ready to receive biometrics and indicate a second color to illustrate to the user that the received biometrics are invalid.

The sensor circuit 102 may connect to the key circuit 104 via an internal connector 106. As shown, this connection includes connection of various wires, such as power, first and second switching lines to the BCM, and a serial communication line for communication between the sensor circuit 102 and the key circuit 104. It should be noted that for packaging reasons, the sensor circuit 102 and the key circuit 104 may be connected over the serial communication wire as opposed to being on the same circuit board. Nevertheless, it should be noted that regardless of packaging, the described techniques for communication between these components apply either over a wire or over traces of the same circuit board within the same module.

Turning to the key circuit 104, the key circuit 104 may include components to facilitate access to the vehicle consistent with the operation of a passive entry key fob. In a passive entry system, the vehicle periodically sends low frequency (LF) beacon requests (e.g., 120 to 135 KHz) for the presence of a key. If the key is in range, a challenge response protocol between the vehicle and key follows to grant or deny access, in which an ultra-high frequency (UHF) response (e.g., 315 or 433 MHz) is provided back to the vehicle from the key. As shown, the key circuit 104 includes a LF receiver 116 and a UHF transmitter 118 operating under the control of a key controller 120 to emulate this challenge response functionality of a key fob. It should be noted that this is only an example, and in other cases the key circuit 104 may utilize other communications protocols. These communications protocols, may include, but are not limited to, LF/UHF, Bluetooth Low Energy (BLE), Ultrawide Band (UWB), etc. Thus, the key circuit 104 takes advantage of the existing access capabilities of the vehicle to provide access to the vehicle. Moreover, the key circuit 104 may be sized to fit within a wire pigtail 122 of the fingerprint authenticated start button 100, facilitating ease of construction of the fingerprint authenticated start button 100.

As shown, the external connector 108 of the wire pigtail 122 may include a power input to drive the key controller 120 and also to feed through to power the biometric controller. The external connector 108 may also include the body control module switch lines that feed through to the sensor circuit 102 as well. However, it should be noted that the serial communication channel is between the biometric controller 112 and key controller 120 and does not extend external to the fingerprint authenticated start button 100.

The biometric sensor 110 may be configured to provide captured biometric data to the biometric controller 112. The biometric controller 112 may validate the biometric data using the stored data regarding authorized users. If the biometric data received from the biometric sensor 110 matches stored biometrics of an authorized user, then the biometric controller 112 signals the key circuit 104 to initiate access (e.g., vehicle start). This design protects vehicle security, as it relies on the existing keyed access system, and also protects privacy of the user, as the biometric data remains localized to the biometric sensor 110 and biometric controller 112 components.

However, security between the sensor circuit 102 and the key circuit 104 may be an issue. Theoretically, a malicious user could acquire a fingerprint authenticated start button 100, learn the sensor circuit 102 to the malicious user's own biometric, and then connect that sensor circuit 102 to the key circuit 104 portion of another vehicle. As such, it is desirable to include a security protocol that accounts for a pairing process between the sensor circuit 102 and the key circuit 104 as well as for intrusion detection.

Figure 2:
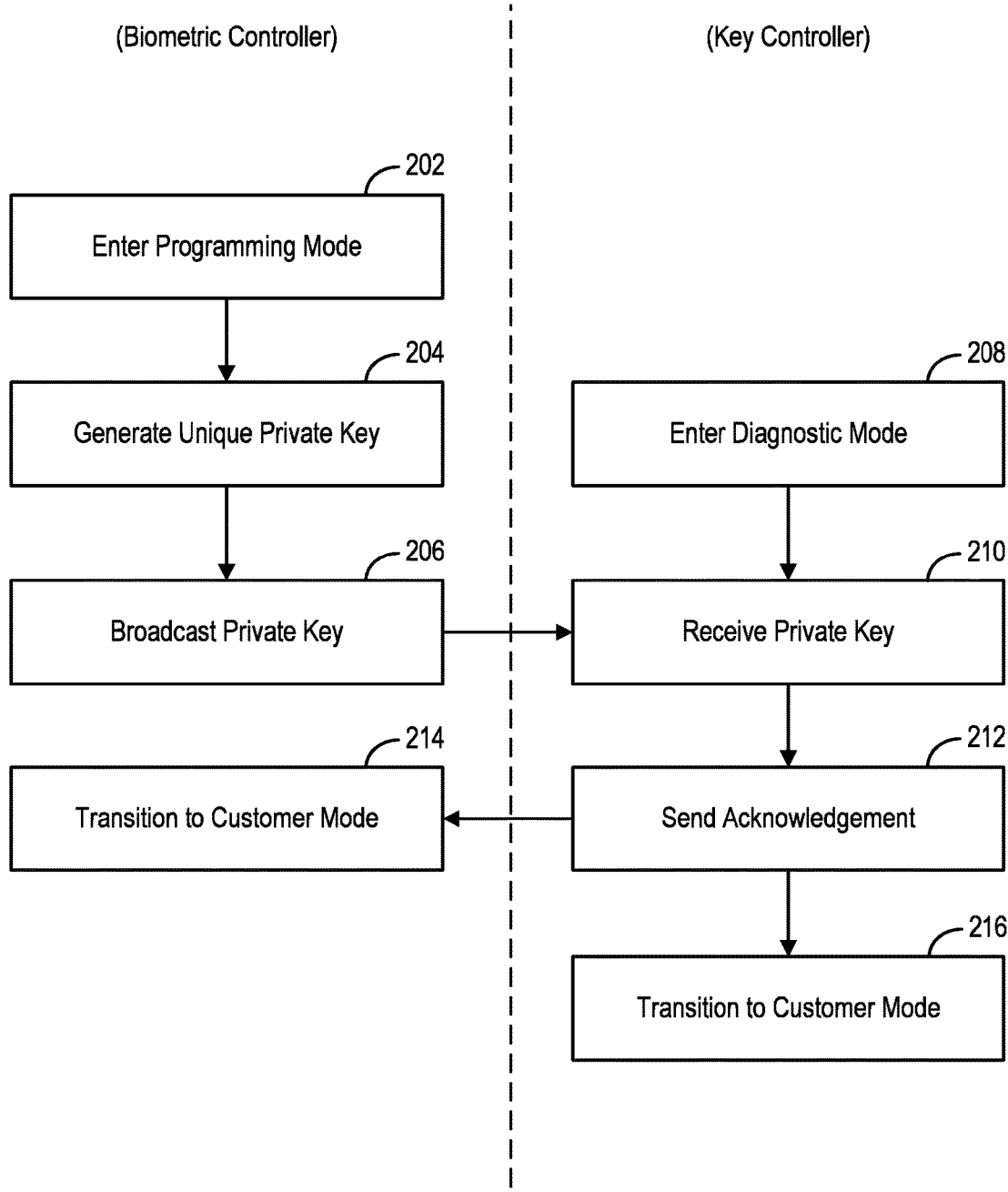
FIG. 2 illustrates an example process for pairing the sensor circuit and the key circuit of the fingerprint authenticated start button.

FIG. 2 illustrates an example process 200 for pairing the sensor circuit 102 and the key circuit 104 of the fingerprint authenticated start button 100. In an example, the process 200 may be performed by the components of the fingerprint authenticated start button 100 discussed in detail above.

At operation 202, the biometric controller 112 enters a programming mode. In an example, the programming mode may be a factory mode before the vehicle has been delivered to the user or in a service mode in which an authorized maintenance provider is operating on the vehicle. This programming mode may be entered, in one example, by entry of a factory code or other code to the vehicle, whose entry may be communicated to the biometric controller 112 via the BCM.

At operation 204, the biometric controller 112 generate a unique private key. The unique private key may serve as a shared secret between the biometric controller 112 and the key controller 120 to facilitate trust between the biometric controller 112 and key controller 120. In an example, the unique private key may be in the form of a one-time pad. A one-time pad is a random key of length at least as long as the data to be encrypted. The data elements of the information to be encrypted are combined with corresponding data elements of the one-time pad. So long as the one-time pad is truly random, the encrypted message cannot be mathematically decrypted without access to the one-time pad. The private key may be stored to a secure enclave of the biometric controller 112 for further use.

At operation 206, the biometric controller 112 broadcasts the private key to the key controller 120. In an example, while in the programming mode the biometric controller 112 may continually broadcast the private key over the serial connection to the key controller 120. It should be noted that, to increase security of the private key during transport, the private key may be encrypted using an encryption key known to both the biometric controller 112 and the key controller 120.

At operation 208, the key controller 120 enters a diagnostic mode. In an example, the key controller 120 may enter the diagnostic mode responsive to the same condition as communicated over the BCM switch lines to the biometric controller 112 via the BCM.

At operation 210, the key controller 120 receives the private key. In an example, the key controller 120 receives the private key as broadcast by the biometric controller 112 over the serial connection at operation 206. The private key may also be encrypted using the encryption key known to both the biometric controller 112 and the key controller 120. The private key may be stored to a secure enclave of the key controller 120 for further use.

At operation 212, the key controller 120 sends an acknowledgement to the biometric controller 112. The acknowledgement may be sent from the key controller 120 to the biometric controller 112 over the serial communication line, in an example. In many cases, the acknowledgement may be a simple response sufficient to cause the biometric controller 112 to confirm that the private key was received.

At operation 214, the biometric controller 112 transitions to a customer mode. For example, responsive to receipt of the acknowledgement sent by the key controller 120 at operation 212, the biometric controller 112 reverts to customer mode in which authentications may be performed. At operation 216, and in response to receiving the private key the key controller 120 transitions back to customer mode in which authentications may be performed. Accordingly, at this point the biometric controller 112 and key controller 120 are paired, and the process 200 ends.

Figure 3:
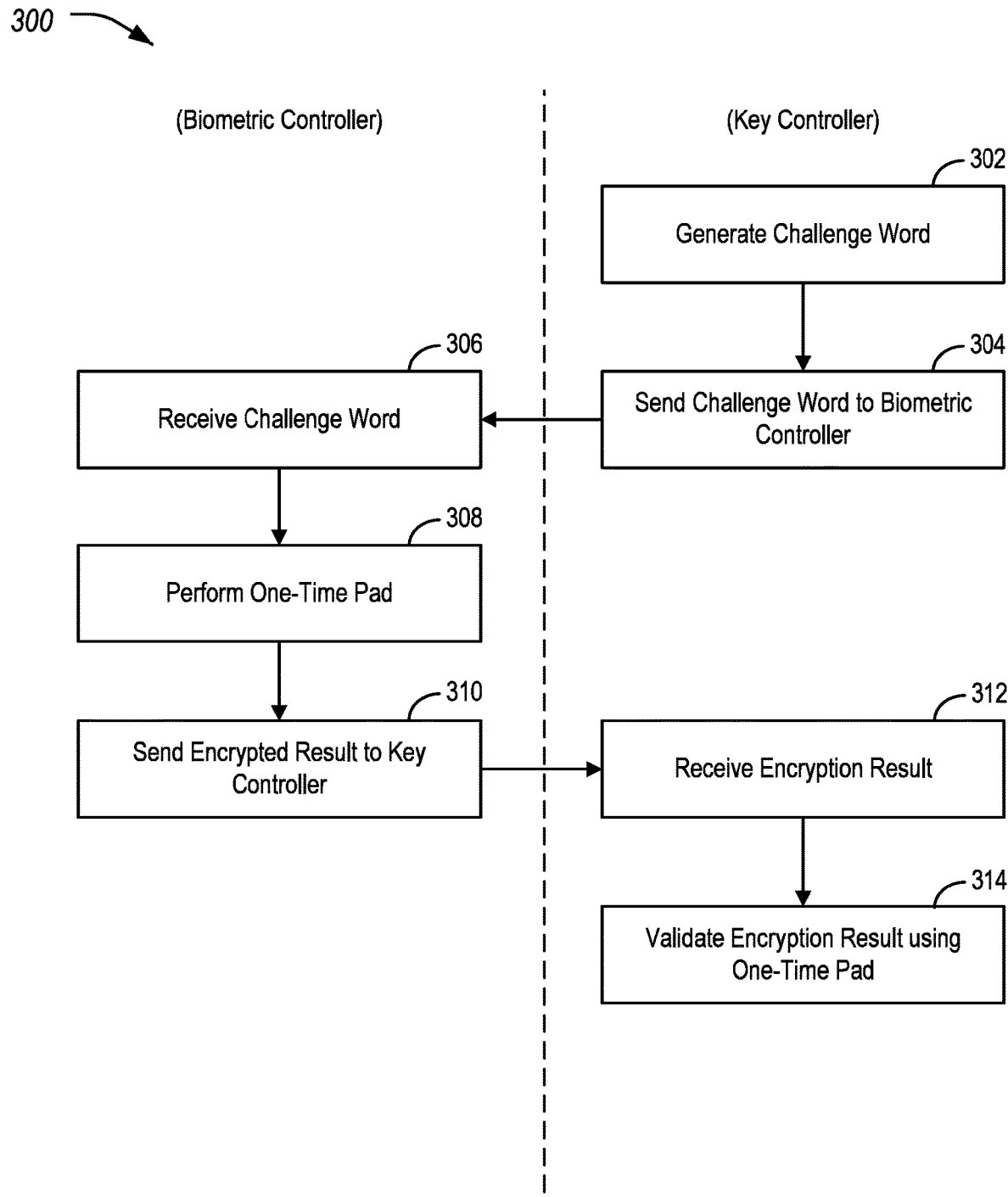
FIG. 3 illustrates an example process for validating the pairing of the sensor circuit and the key circuit via a challenge.

FIG. 3 illustrates an example process 300 for validating the pairing of the biometric controller 112 and key controller 120 via a challenge. In an example, the process 300 may be performed by the components of the fingerprint authenticated start button 100 discussed in detail above, as paired according to the process 200.

At operation 302, the key controller 120 generates a challenge word. In an example, the key controller 120 may generate a message of a fixed size, such as 128 random bits.

At operation 304, the key controller 120 sends the challenge word to the biometric controller 112. For instance, the challenge word may be sent by the key controller 120 to the biometric controller 112 over the serial communication line. At operation 306, the biometric controller 112 receives the challenge word from the key controller 120.

At operation 308, the biometric controller 112 performs a one-time pad of the challenge word using the private key. For instance, the biometric controller 112 may supply the challenge word to the secure enclave of the sensor circuit 102, which may encrypt the challenge word using the private key stored via the process 200. This encryption may as one example, include a bitwise operation performed to the challenge word using the bits of the private key.

At operation 310, the biometric controller 112 sends the encryption result to the key controller 120. For instance, the encryption result may be sent by the biometric controller 112 to the key controller 120 over the serial communication line. At operation 312, the key controller 120 receives the encryption result from the biometric controller 112.

At operation 314, the key controller 120 validates the encryption result using the one-time pad. In an example, if the correct private key was used by the biometric controller 112, the key controller 120 would be able to recreate the original challenge word by apply a reverse operation with the one-time pad using its copy of the private key. For instance, the key controller 120 may supply the encryption result to the secure enclave of the key controller 120, which may decrypt the encryption result using the private key stored to the key controller 120 via the process 200. If decryption does not result in the original challenge word, it may be suspected that the key controller 120 was tampered with. In another example, the challenge word may be encrypted by both the key controller 120 and the biometric controller 112, and the encrypted results of both operations may be compared to determine whether the system was tampered with. After operation 314, the process 300 ends.

Variations on the pairing process 300 are possible. In another example, hashing may be used instead of a key-based cryptographic challenge. For instance, responsive to a request the key controller 120 may send a challenge to the biometric controller 112 to validate a pairing of the sensor circuit 102 to the key circuit 104. A hash result may be received back to the key controller 120 from the biometric controller 112 based on operation of a hash function on the challenge by the biometric controller 112. The request may be authenticated responsive to the hash result from the biometric controller 112 being confirmed according to operation of the hash function on the challenge by the key controller 120. For instance, if the two hashed values are the same then the cryptographic challenge succeeds, and the pairing is deemed successful. It should be noted that other variations on a cryptographic challenge may be used for identity verification, such as a clear text or blockchain cryptographic verification.

Figure 4:
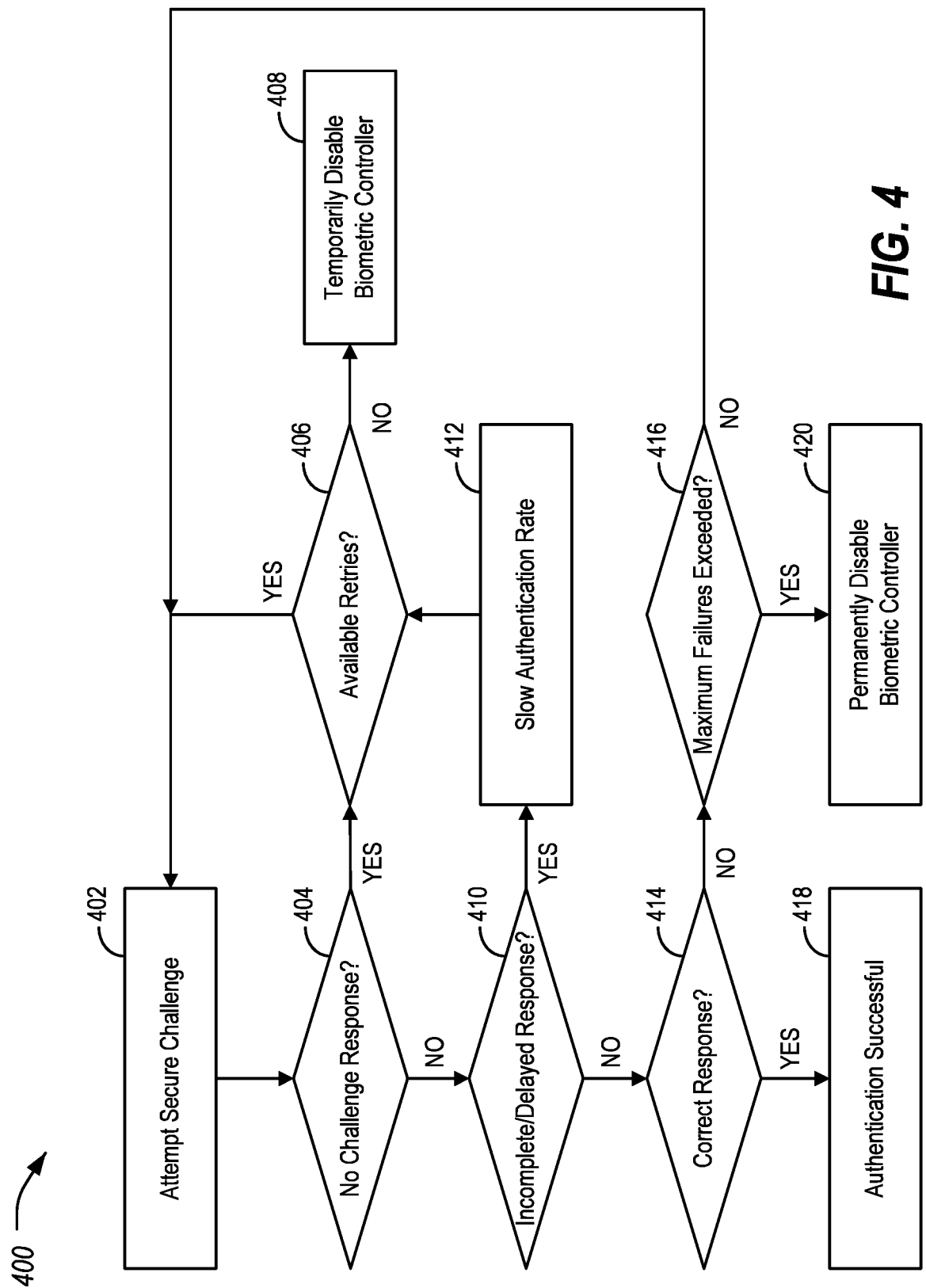
FIG. 4 illustrates an example process for performing security actions according to the validating of the challenge.

FIG. 4 illustrates an example process 400 for performing security actions according to a validation of the challenge. As with the processes 200 and 300, the process 300 may be performed by the components of the fingerprint authenticated start button 100 discussed in detail above.

At operation 402, a secure challenge is attempted. In an example, the secure challenge may be performed by the key controller 120 as described above with respect to the process 300. The secure challenge may be performed based on various triggers to optimize security with power consumption. As some examples, these triggers may include one or more of: (i) the start button receiving power, (ii) a time based interrupt as commanded by the key controller 120, (iii) responsive to the key controller 120 receiving a localization request from the BCM, and/or (iv) responsive to a press of the start button itself.

At operation 404, the key controller 120 determines whether or not a challenge response is received. If a response is received, control continues to operation 410. If no challenge response is received to the key controller 120 (e.g., no response is received at operation 312 of the process 300), control passes to operation 406 to identify whether additional retries are available.

Various conditions may result in a lack of receipt of the challenge response. Examples of such conditions may include the communication bus wiring between the key controller 120 and the biometric controller 112 being damaged, the biometric controller 112 being faulty, or the biometric controller 112 not having power. Under these use cases the key controller 120 may continue to broadcast the challenge words for a predefined duration. However, after expiration of the predefined duration, the challenge response may be determined to not be received. If so, the key controller 120 may attempt a predefined number of retries, such as three retries. (It should be noted that in some implementations no retries may be allowed.) If additional retries are available, control returns to operation 402 to attempt a further security challenge. If not, control passes to operation 408 to temporarily disable operation of the biometric controller 112.

For instance, at operation 408 the key controller 120 may elect not to respond to messaging from the biometric controller 112. The key controller 120 may be configured to perform other reporting operations as well. For instance, if the vehicle uses a Bluetooth Low Energy (BLE) or Wi-Fi based key, a diagnostic error code may be broadcast by the key controller 120 to a radio frequency (RF) Transceiver Module (RTM) or to a remote keyless entry (RKE) module of the vehicle to indicate the error condition. Additionally, vehicles with such a fingerprint authenticated start button 100 as discussed herein may similarly throw a diagnostic error code for a faulty start button. These diagnostic codes may be used to inform a service person that there is a fault with the start button to assist with repair. Under such conditions, fingerprint start may not be allowed; however, traditional key fob ignition would still be permitted. Feedback may be provided to the user of the disabled status. For instance, the status indicator 114 may be controlled to flash red.

At operation 410, the key controller 120 determines whether or not the received challenge response is incomplete or delayed. If a complete response is received, control continues to operation 414. However, this may not always be the case. For instance, an incomplete response may occur if the biometric controller 112 is overwhelmed with computation (e.g., such as responding to a challenge when suddenly a fingerprint verification interrupt is triggered). Or, such a situation may occur if the serial communication bus between the biometric controller 112 and the key controller 120 is dropping packets. Responsive to these conditions, control may pass to operation 412 to cause the key controller 120 to implement a slower interrupt rate to give the biometric controller 112 further time to finish its current computation. After operation 412, control passes to operation 406 to retry the challenge response, if retries remain, using the relaxed timing.

At operation 414, the key controller 120 determines whether the received response is correct. In an example, as discussed above with respect to operation 314 of the process 300, the key controller 120 verifies whether the response from the biometric controller 112 is correct. If so, control passes to operation 418 to confirm that the authentication is successful. If not, then control passes to operation 416.

Regarding incorrect challenge responses, such a scenario may be due to various causes. In an example, this may be due to faulty biometric controller 112. In another example, this may be due to an attempted swap of a sensor circuit 102 from one user's fingerprint authenticated start button 100 into another vehicle to attempt to gain access to the vehicle. In an example, a predefined number of incorrect challenge responses may be permitted (e.g., a predefined maximum number of consecutive incorrect responses, an overall number of incorrect responses, etc.). Responsive to occurrence of the predefined number of incorrect challenge responses, control may pass to operation 420 to permanently disable the biometric controller 112. Moreover, vehicles equipped with a global start module may additionally trigger an intrusion countdown warning and/or visual/audio theft alarm.

Continuing with possible disabling actions at operation 420, additional security may be gained by having the biometric controller 112 send an intrusion warning to the sensor circuit 102 to break a shorting block relay in the internal connector 106 connecting the sensor circuit 102. This may prevent the sensor circuit 102 from allowing the BCM switch pins to connect when the start button is pressed, which would require the vehicle to be inspected by a dealership or authorized service person prior to ignition via the button being allowed. It may be recommended, however, that this functionality be an option the customer can opt into when retrofitting their vehicle. In an example, a software tool used in enrollment of the vehicle with the fingerprint authenticated start button 100 may be configured to set a data identifier of the vehicle to enable this mode. Accordingly, users or fleet operators who prefer this extra security can configure or otherwise opt into it.

While many examples herein relate to secure access to a vehicle, it should also be noted that the described smart sensor-controller secure communication framework may be applied as a general methodology for tampering detection, beyond the scope of biometrics for vehicle access.

For instance, aspects of the described techniques may be utilized for cabin monitoring sensors, where interior cabin sensors monitor the health and occupant location and publish the status to the biometrics controller. In a non-biometric example, driver assist sensors (camera, radar, ultrasonic, LIDAR) may be included in a vehicle to perform object detection, reasoning, localizing, mapping and/or threat analysis, where the results may be published to an ADAS controller of the vehicle. In yet another example, a vehicle network controller may be considered as a smart sensor (e.g., as a source of trusted data), where the gateway module may perform the cryptographic challenge for messaging that directly effects vehicle access/start control or driving controls (e.g., to validate messages to a BCM or ADAS controller). In a further example, wireless communication transceivers, such as the transceivers for TCU or PaaK modules, may receive inputs and pre-process them for the main technology controller. As an even further example, powertrain sensors may be used for monitoring the health and power output of ICE/BEV powerplants as monitored by an operational controller.

Despite these different applications, in each situation a sensor provides trusted data, while an operational circuit perform an identity verification using a cryptographic challenge to authenticate the sensor circuit before utilizing the trusted data.

Figure 5:
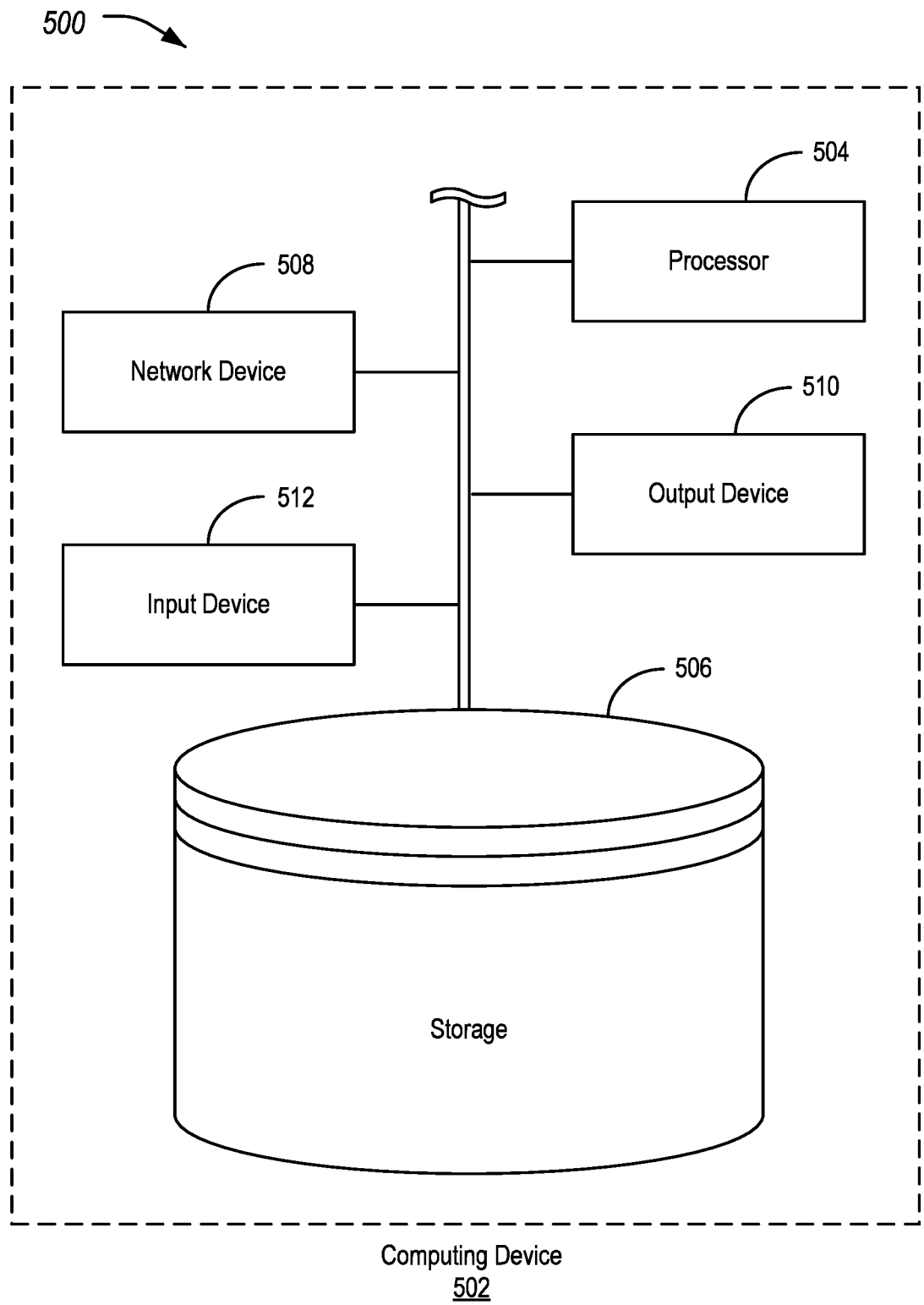
FIG. 5 illustrates an example of a computing device for use in the performance of security actions according to validation of a security challenge.

FIG. 5 illustrates an example 500 of a computing device 502 for use in the performance of security actions according to validation of a security challenge. Referring to FIG. 5, and with reference to FIGS. 1-4, the biometric controller 112 and key controller 120 may be examples of such computing devices 502. As shown, the computing device 502 may include a processor 504 that is operatively connected to a storage 506, a network device 508, an output device 510, and an input device 512. It should be noted that this is merely an example, and computing devices 502 with more, fewer, or different components may be used.

The processor 504 may include one or more integrated circuits that implement the functionality of a central processing unit (CPU) and/or graphics processing unit (GPU). In some examples, the processors 504 are a system on a chip (SoC) that integrates the functionality of the CPU and GPU. The SoC may optionally include other components such as, for example, the storage 506 and the network device 508 into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families.

Regardless of the specifics, during operation the processor 504 executes stored program instructions that are retrieved from the storage 506. The stored program instructions, accordingly, include software that controls the operation of the processors 504 to perform the operations described herein. The storage 506 may include both non-volatile memory and volatile memory devices. The non-volatile memory includes solid-state memories, such as NAND flash memory, magnetic and optical storage media, or any other suitable data storage device that retains data when the system is deactivated or loses electrical power. The volatile memory includes static and dynamic random-access memory (RAM) that stores program instructions and data during operation of the fingerprint authenticated start button 100.

The GPU may include hardware and software for display of at least two-dimensional (2D) and optionally three-dimensional (3D) graphics to the output device 510. The output device 510 may include a graphical or visual display device, such as an electronic display screen, projector, printer, or any other suitable device that reproduces a graphical display. As another example, the output device 510 may include an audio device, such as a loudspeaker or headphone. As yet a further example, the output device 510 may include a tactile device, such as a mechanically raiseable device that may, in an example, be configured to display braille or another physical output that may be touched to provide information to a user.

The input device 512 may include any of various devices that enable the computing device 502 to receive control input from users. Examples of suitable input devices that receive human interface inputs may include keyboards, mice, trackballs, touchscreens, voice input devices, graphics tablets, and the like.

The network devices 508 may each include any of various devices that enable the computing device 502 send and/or receive data from external devices over networks. Examples of suitable network devices 508 include an Ethernet interface, a Wi-Fi transceiver, a cellular transceiver, or a Bluetooth or BLE transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact disks (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for secure sensor operation, comprising:
   a sensor circuit including a biometric sensor and a biometric controller configured to provide trusted data, including to:
      receive biometric data of a user from the biometric sensor responsive to a user press of a button signaling a body control module, and
      send a start request responsive to the biometric data matching to learned biometric data stored to a secure enclave of the biometric controller, wherein the biometric data remains localized to the biometric sensor and biometric controller and is not provided in the start request; and
   a key circuit, connected to the sensor circuit via an internal connector, the key circuit including an operational controller configured to responsive to receipt of the start request to start a vehicle over the internal connector from the biometric controller, send a challenge word over the internal connector to the sensor circuit to validate a pairing of the sensor circuit to the key circuit, receive an encryption result from the sensor circuit over the internal connector based on the challenge word and a private key previously provided to the sensor circuit in a pairing mode, and authenticate the start request as being received from the paired sensor circuit responsive to the encryption result to confirm according to a copy of the private key maintained by the key circuit that the sensor circuit has not been swapped out, thereby validating that the start request was received from the sensor circuit that is paired to the key circuit.

2. A non-transitory computer-readable medium comprising instructions for secure biometric-authenticated start of a vehicle that, when executed, cause a key controller of a key circuit and a biometric controller of a sensor circuit connected over an internal connector to:

in a pairing mode, generate a private key by the biometric controller of the sensor circuit and send the private key to the key controller;

store the private key to a secure enclave of the sensor circuit;

store a copy of the private key to a secure enclave of the key circuit;

in a consumer mode, receive biometric data from a biometric sensor responsive to a user press of a button signaling a body control module to start the vehicle;

send a start request, over the internal connector from the biometric controller to the key controller, responsive to the biometric data matching to learned biometric data stored to the secure enclave of the key circuit;

responsive to receipt of the start request over the internal connector from the biometric controller to the key controller, send a challenge word over the internal connector to the sensor circuit to validate a pairing of the sensor circuit to the key circuit;

receive an encryption result over the internal connector from the sensor circuit based on the challenge word and the private key previously provided to the sensor circuit in the pairing mode; and authenticate the start request as being received from the paired sensor circuit responsive to the encryption result to confirm according to the copy of the private key maintained by the key circuit that the sensor circuit has not been swapped out, thereby validating that the start request was received from the sensor circuit that is paired to the key circuit.

3. The medium of claim 2, further comprising instructions that, when executed, cause the key controller and the biometric controller to:

encrypt the private key by the biometric controller for transport to the key controller using an encryption key known to the key controller; and decrypt the private key by the key controller using the encryption key.

4. The medium of claim 2, further comprising instructions that, when executed, cause the biometric controller to encrypt the challenge word using the private key as stored to the sensor circuit to generate the encryption result, wherein to encrypt the challenge word includes to perform a bitwise operation on the challenge word using bits of the private key as a one-time pad.

5. The system of claim 1, wherein the biometric controller is further configured to, in a programming mode, generate the private key and send the private key over the internal connector to a key controller of the key circuit, and the key controller is configured to, in a diagnostic mode, receive and store the private key.

6. The system of claim 5, wherein the biometric controller is further configured to encrypt the private key for transport over the internal connector to the key controller using an encryption key known to the key controller, and the key controller is further configured to decrypt the private key using the encryption key.

7. The system of claim 1, wherein the sensor circuit is further configured to encrypt the challenge word using the private key as stored to the sensor circuit to generate the encryption result.

8. The system of claim 7, wherein to encrypt the challenge word includes to perform a bitwise operation on the challenge word using bits of the private key as a one-time pad.

9. The system of claim 7, wherein the key circuit is further configured to one or more of:

confirm the encryption result by performing a decryption operation using the private key on the encryption result to generate a decrypted value and comparing the decrypted value to the challenge word; or encrypt the challenge word using the private key as stored to the key circuit to determine a second result, and confirm the encryption result by comparing the encryption result to the second result.

10. A method for secure biometric-authenticated start of a vehicle using a key circuit connected to a sensor circuit via an internal connector, comprising:

responsive to receipt of a start request to start the vehicle over the internal connector from a biometric controller of the sensor circuit to a key controller of the key circuit, sending a challenge word over the internal connector to the sensor circuit to validate a pairing of the sensor circuit to the key circuit;

receiving an encryption result from the sensor circuit based on the challenge word and a private key previously provided to the sensor circuit in a pairing mode; and authenticating the start request as being received from the paired sensor circuit responsive to the encryption result to confirm according to a copy of the private key maintained by the key circuit that the sensor circuit has not been swapped out, thereby validating that the start request was received from the sensor circuit that is paired to the key circuit.

11. The method of claim 10, further comprising:

storing the private key to a secure enclave of the sensor circuit;

storing the copy of the private key to a secure enclave of the key circuit;

receiving biometric data from a biometric sensor responsive to a user press of a button signaling a body control module; and sending the start request over the internal connector responsive to the biometric data matching to learned biometric data stored to the secure enclave of the key circuit, wherein the biometric data remains localized to the biometric sensor and biometric controller and is not provided in the start request.

12. The method of claim 11, further comprising, in the pairing mode, generating the private key by the biometric controller of the sensor circuit and sending the private key over the internal connector to the key controller.

13. The method of claim 12, further comprising:

encrypting the private key by the biometric controller for transport over the internal connector to the key controller using an encryption key known to the key controller; and decrypting the private key by the key controller using the encryption key.

14. The method of claim 11, further comprising encrypting the challenge word using the private key as stored to the sensor circuit to generate the encryption result.

15. The method of claim 14, wherein to encrypt the challenge word includes to perform a bitwise operation on the challenge word using bits of the private key as a one-time pad.

16. The method of claim 14, further comprising confirming the encryption result by one of:

performing a decryption operation using the private key on the encryption result to generate a decrypted value and comparing the decrypted value to the challenge word; or encrypting the challenge word using the private key as stored to the key controller to determine a second result and confirming the encryption result by comparing the encryption result to the second result.

17. The medium of claim 2, further comprising instructions that, when executed, cause the key controller to confirm the encryption result by one of to:

perform a decryption operation using the private key on the encryption result to generate a decrypted value and comparing the decrypted value to the challenge word; or encrypt the challenge word using the private key as stored to the key controller to determine a second result and confirming the encryption result by comparing the encryption result to the second result.

* * * * *